United States Patent [19]

Cechetini

[11] 3,836,226

[45] Sept. 17, 1974

[54] REFLECTIVE PAVEMENT MARKER

[76] Inventor: James A. Cechetini, 1749 Orion Way, Sacramento, Calif. 95825

[22] Filed: July 23, 1973

[21] Appl. No.: 381,462

[52] U.S. Cl. .................... 350/103, 350/105, 404/14
[51] Int. Cl. .............................................. G02b 5/12
[58] Field of Search ............................ 350/97–109; 404/9–16

[56] References Cited
UNITED STATES PATENTS

| | | | |
|---|---|---|---|
| 3,556,637 | 1/1971 | Pamquist | 350/105 |
| 3,784,279 | 1/1974 | Hedgewick | 350/103 |

*Primary Examiner*—Ronald L. Wibert
*Assistant Examiner*—Michael J. Tokar

[57] ABSTRACT

An improved pavement marker adapted to retroflect the headlight beams of oncoming vehicles is disclosed. The marker includes a trapezoidal support block of reflective glass spheres in a cement binder, the bottom surface of which attaches to the pavement. The support block has oppositely directed side faces acutely inclined to the pavement, and a reflective grid overlies each side face. The grid comprises a plurality of retrodirective elements formed in a sheet of refective material. Each retrodirective element comprises a multi-faceted diamond shaped figure having pairs of opposing facets all meeting at a common vertex. The facets of each pair diverge outwardly from the vertex forming half-angles of substantially 45° so that the light impinging on the element is retroflected parallel to direction of impingement with a minimum number of internal reflections. A layer of light-refractive translucent material covers the exposed surfaces of the support block including the side faces, and provides a refractive surface which directs light from headlights of approaching vehicles at the reflective grid generally parallel to the central axes of the elements. The light is thus retroflected back at the approaching vehicles through the refractive surface. If the grid becomes partially eroded due to the traffic abrasion the underlying reflective block retains partial reflectivity.

8 Claims, 4 Drawing Figures

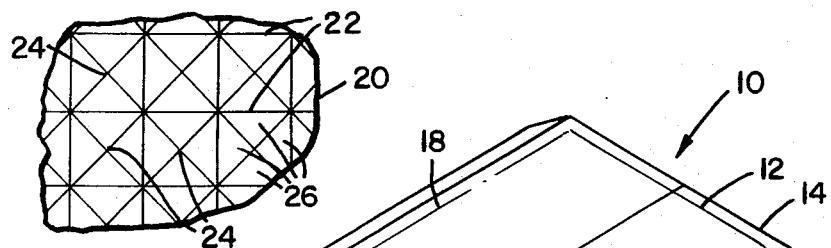
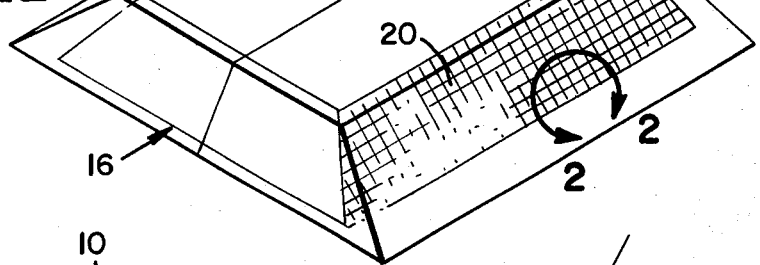
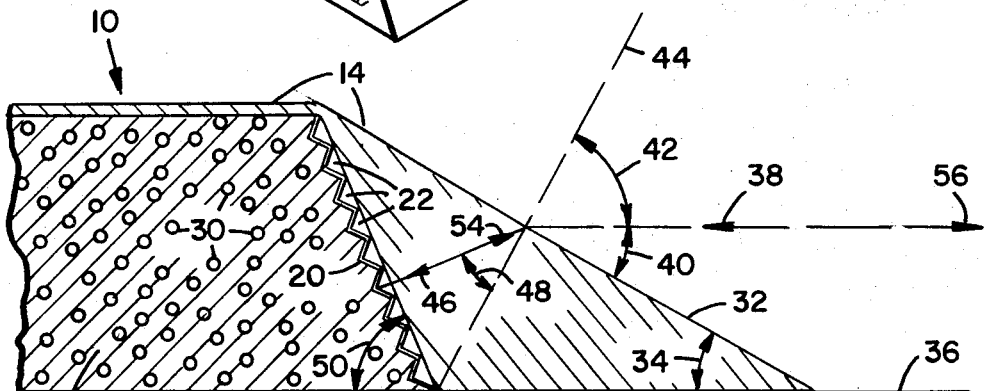
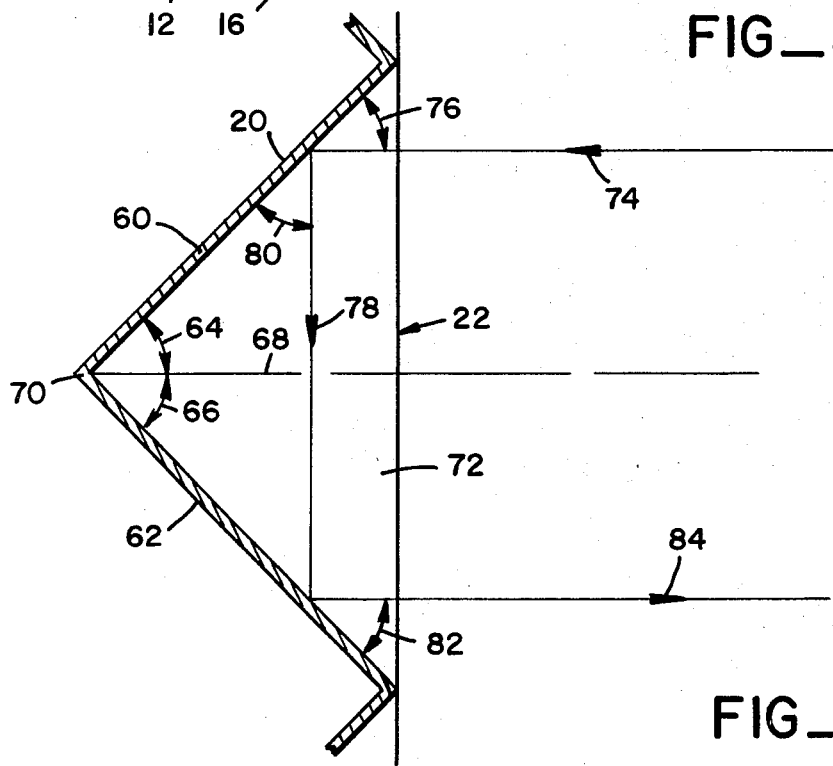

3,836,226

REFLECTIVE PAVEMENT MARKER

BACKGROUND OF THE INVENTION

The present invention relates to pavement markers, and in particular to an improved pavement marker adapted to minimize the effects of road wear.

In a relatively short period of time, the use of reflective pavement markers to divide lanes in a roadway has become extremely common, especially in warmer climates where snow is not a problem. However, the service life for such markers has been found to be relatively short, as low as one and one-half years under severe conditions to three to eight years for most freeway locations. Since the reflective grid in the markers currently used is adjacent to the outer plastic surface, a relatively small amount of erosion of the block completely eliminates its reflective properties. When this occurs, the support block must be removed and replaced.

Removal of the block can be a far more difficult task than initial placement of the block since the block has been epoxied to the pavement surface and has become firmly bonded thereto. The expense of such removal is greatly increased when certain of the blocks in critical areas must be replaced on an individual basis. The problems and expense involved in properly maintaining the markers which motorists have come to rely on for dividing lanes is only now becoming apparent.

Pavement markers of the above type are typified by the marker disclosed in the Patent to Heenan, U.S. Pat. No. 3,332,327. Such marker employs an underlying trapezoidal support block which can be epoxied to the pavement. Reflective grids having a plurality of reflective elements of the cube corner type overlie two oppositely directed side faces of the support block. The exposed surfaces of the support block are covered with a layer of translucent plastic which has a high refractive index to direct light from the headlights of approaching vehicles at the reflective grid.

An object of the present invention is to provide a combination of novel features which act to extend the life of pavement markers generally similar to the above type. Specifically, the underlying support block is constructed of homogeneous light reflective material, such as glass beads in a white cement binder. The reflective grid employs a plurality of diamond-shaped elements in contrast to the conventional cube corner elements. Each element comprises a multi-faceted diamond-shaped figure having pairs of opposing facets all meeting at a common vertex. The facets of each pair diverge outwardly from the vertex and have included half-angles of substantially 45°.

An advantage of constructing the underlying support block from homogeneous light reflective material is that the support block serves as a back-up reflector when the overlying reflective grid is worn away by vehicles passing over the marker. The worn marker does not have the brilliance of the original marker, but sufficient reflectivity is retained so that the worn pavement marker is quite visible, even when it is raining and the marker is most needed. This is in contrast with prior art markers which retain no reflectivity whatsoever after the reflective grid is eroded away. When the pavement marker of the present invention is placed in a critical location and becomes eroded prior to erosion of other markers in the area, it need not be immediately replaced but can be left until the entire set of markers are to be replaced. The reflectivity of the support block is sufficient to avoid a gap in the set of reflective markers which can be misleading and dangerous to the motorist. If desired, the marker of the present invention can be left in place until completely worn away, eliminating the need for physically removing the worn marker.

An advantage of utilizing the diamond-shaped reflective elements is that the elements themselves can be varied in inclination relative to the overall plane of the grid. This allows for greater flexibility in the design of the pavement marker itself, since the relative inclination of the refractive plastic layer and the reflective grid can be varied to optimize the cleansing action of the refractive surface. Also, a thicker layer of plastic can be provided so that erosion of the reflective grid is delayed. The cube corner reflector, on the other hand, is limited in that each grid element must be stacked at a particular angle to the overall plane of the grid, as disclosed by the above patent to Heenan. Furthermore, the cube corner reflector requires three internal reflections to re-direct light impinging on the element, whereas the diamond-shaped reflector of the present invention has the advantage of requiring only two internal reflections. Since the reflective properties of the grid material are not perfect, reducing the number of internal reflections tends to increase the brilliance of the reflection to provide a more effective marker.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the pavement marker of the present invention;

FIG. 2 is a fragmentary blow-up view of the reflective face of the pavement marker illustrating the area included by lines 2—2 of FIG. 1;

FIG. 3 is a side cross-sectional view of the pavement marker illustrated in FIG. 1 and further illustrating light transmission paths related thereto;

FIG. 4 is a fragmentary side elevation view of one of the reflective elements.

DESCRIPTION OF THE PREFERRED EMBODIMENT

The general conformation of the pavement marker 10 of the present invention is illustrated by way of reference to FIG. 1. Pavement marker 10 has an underlying trapezoidal support block 12 having all exposed surfaces covered by a layer of plastic 14. The side faces of the support block 12 are acutely inclined to a base surface 16 adapted to be epoxied or otherwise attached to the pavement. Two oppositely directed side faces of support block 12 are covered by sheets 18 and 20 of polished aluminum or other reflective material.

Aluminum sheets 18 and 20 are each formed into a grid of reflective elements 22 as illustrated by way of reference to FIG. 2. The elements 22 in the grid are basically identical, and each comprises a four sided figure formed in a diamond configuration. Each side or facet 26 of the figure extends from a common vertex 24 outwardly to the outer surface of the grid. The elements are inter-connected at their outer extremities to provide a continuous grid having 100% reflective efficiency. The four sides 26 of each reflective element 22 are composed of two pairs of mutually opposing facets. Each pair of opposing facets meets at vertex 24 with an included half angle of 45°.

The configuration of pavement marker 10 is further illustrated by way of reference to the cross-sectional elevation view of FIG. 3. Plastic layer 14 covers the upper surface of support block 12 and the side face covered by aluminum grid 20. The side face covered by aluminum grid 18 is similarly covered by plastic 14. In this preferred embodiment, the plastic 14 covering grid 20 is extended outwardly from the grid toward the base of block 12. This provides a thicker layer of plastic 14 than found in the prior art to extend the service life of the plastic layer and inhibit early wear of grid 20. Hence, the effective service life of the marker 10 is extended.

When plastic layer 14 becomes sufficiently eroded so that grid 20 is exposed and also eroded, the composition of the support block 12 provides a back-up reflector. Namely, support block 12 of the present invention comprises a homogeneous light-reflective mixture. This mixture is preferably a white cement binder impregnated with spherical glass beads 30 although other light-reflective compositions could be used as well. Titanium Dioxide can be added to the white cement as an additional whitener to increase the reflective properties of the cement itself. Hence, when grid 20 becomes partially worn, the reflective properties of support block 12 provide a partial substitute for the grid. Furthermore, when grid 20 becomes completely eroded, support block 12 still provides a reflective mechanism, even though overall reflective efficiency is decreased.

The manner in which the overlying plastic layer 14 and grid 20 are used in combination to retroflect light emanating from the headlights of approaching vehicles back at the vehicles is further illustrated by way of reference to FIG. 3. In the illustrated embodiment of the present invention, the angular relationships between the various members are fully defined. However, these angular relationships are presented for the purposes of illustration only and are not to be understood as defining the limits of the invention. Plastic layer 14 has a refractive surface 32 inclined at an angle 34 of 28° with respect to the pavement 36. Light from the headlights of approaching vehicles impinges on refractive surface 32 approximately horizontal to pavement 36, as illustrated by arrow 38. Hence, the angle 40 between the incident light beam 38 and refractive surface 32 is also 28°, so that the angle 42 between light beam 38 and the normal 44 to refractive surface 32 is 62°. In the preferred embodiment, plastic layer 14 has a refractive index equal to 1.5 so that incident light beam 38 is refracted to path 46 which is at an angle 48 of approximately 36° with normal 44. The surface plane of grid 20 is at an angle 50 of approximately 64° with pavement 36. Hence, light 46 directed at grid 20 by the refractive surface 32 is directed along a path substantially normal to the surface plane of the grid, although this is not an absolute requirement.

The reflective elements 22 of the present invention are constructed so that light impinging on the elements is reflected back along a path 54 parallel to the impinging path 46. Refractive surface 32 acts to redirect the path of light 54, directing the light along path 56 back at the approaching vehicle. Hence, with the structure of the present invention, light impinging on the pavement marker 10 parallel to pavement 36 is retroflected at the oncoming vehicle, even though the reflective grid 20 is not normal to the pavement.

The construction of the reflective elements 22 is further illustrated by way of reference to the fragmentary side elevation view of FIG. 4. Element 22 is formed from sheet 20 of polished aluminum or other reflective material, and has two facets 60 and 62 which have included half-angles 64 and 66 of 45°. The half-angles 64 and 66 are measured from each facet to the central axis 68 which bisects the included angle between the facets. Element 22 also has two other opposed side facets also emanating from the common vertex 24. One of the side facets 72 is visible in FIG. 4, but the other side facet is not visible in the cross-sectional view illustrated.

Light beam 74 is illustrated impinging on facet 60 parallel to central axis 68. Light 74 impinges on facet 60 at an angle 76 of 45°, and is thereby reflected by facet 60 along path 78, again at an angle 80 of 45° to facet 60. Light along path 78 is reflected by facet 62 again at an angle 82 of 45° with facet 62. Hence, light is retroflected along path 84 parallel to incident path 74, which is in turn parallel to the central axis 68. Similarly, light impinging on element 22 non-parallel to central axis 68 is also reflected parallel to the impinging light, although this feature can be difficult to illustrate graphically.

In operation, the horizontal base 16 of the pavement marker 10 is epoxied or otherwise attached to a roadway surface 36. Light from oncoming vehicles is retroflected by the pavement marker back at the oncoming vehicles by the combination of the refractive surface 32 and reflective grid 20. The angle of the refractive surface 32 and the thickness of the plastic material 14 are designed for maximum cleansing action, minimum road wear and increased service life. However, when plastic layer 14 is eroded away and grid 20 in turn becomes eroded, the reflective composition of the underlying support block 12 continues to provide a reflective surface, extending the useful service life of the pavement marker.

While a preferred embodiment of the present invention has been illustrated in detail, it is apparent that modifications and adaptations of that embodiment will occur to those skilled in the art. In particular, the angles of the respective refractive and reflective faces may be varied to increase the service life of the pavement marker. However, it is to be expressly understood that such modifications and adaptations are within the spirit and scope of the present invention, as set forth in the following claims.

What I claim as new is:

1. A pavement marker adapted to retroflect the headlight beams of approaching vehicles, said marker comprising:
   a support block of light reflecting composition, said support block having a generally planar base adapted to be attached to the pavement and having at least one side face acutely inclined to the base;

a reflective grid overlying the side face of the support block, said grid comprising a plurality of reflective elements formed in a sheet of reflective material, each reflective element comprising a multi-faceted figure formed in the reflective material, said figure having two pairs of opposing facets all meeting at a common vertex, the facets of each said pair extending outwardly from said vertex and having included half-angles of substantially 45° so that the light impinging on said element is reflected parallel to said impinging light; and a layer of light refractive material covering at least the side face of the support block, said material providing a refractive surface adapted to direct light from the headlights of approaching vehicles at the reflective grid whereby said light is retroflected by said grid and directed back at the approaching vehicles by the refractive surface.

2. A pavement marker as recited in claim 1 wherein the support block has a substantially homogeneous light reflective composition.

3. A pavement marker as recited in claim 2 wherein the composition of the support block comprises white cement, Titanium Dioxide whitener, and a plurality of glass beads distributed throughout the white cement so that said support block has a substantially homogeneous light reflecting composition.

4. A pavement marker adapted to retroflect the headlight beams of approaching vehicles, said marker comprising:
   a support block of substantially homogeneous light reflecting composition, said support block having a generally planar base adapted to be attached to the pavement and having at least one side face acutely inclined to the base;
   a reflective surface overlying the side face of the support block, said reflective surface adapted so that light impinging on said surface is reflected parallel to said impinging light;
   a layer of light refractive material covering at least the side face of the support block, said material providing a refractive surface adapted to direct light from the headlights of oncoming vehicles at the reflective grid and to direct light reflected by the reflective grid back at the oncoming vehicles, whereby the combination of light-refractive material and the reflective grid retroflect the headlight beams of oncoming vehicles, and upon wear of the light-refractive material and the reflective grid due to road usage, the support block provides a secondary means for retroflecting the headlight beams of approaching vehicles.

5. A pavement marker as recited in claim 4 wherein the support block comprises white cement, and a plurality of glass beads distributed throughout said white cement, so that said support block has a homogeneous light reflecting composition and erosion of the outer surfaces of the support block does not diminish the light reflecting properties thereof.

6. A pavement marker as recited in claim 5 wherein the support block additionally comprises titanium dioxide whitener to increase the reflective properties of said block.

7. In a pavement marker adapted to retroflect the headlight beams of approaching vehicles, said pavement marker including a trapezoidal support block adapted to be attached to the pavement, a reflective grid overlying each of two oppositely directed side faces of the support block, said grids having a plurality of reflective elements formed in a sheet of reflective material, and a layer of refractive material covering the exposed surfaces of the support block, the improvement wherein the support block is constructed of substantially homogeneous light reflective material so that the pavement marker is partially reflective after road wear has eroded the layer of refractive material and the reflective grid.

8. In a pavement marker adapted to retroflect the headlight beams of approaching vehicles, said pavement marker including a trapezoidal support block adapted to be attached to the pavement, a reflective grid overlying each of two oppositely directed side faces of the support block, each said grid comprising a plurality of reflective elements formed in a sheet of reflective material, and a layer of refractive material covering the exposed surfaces of the support block, the improvement wherein each reflective element comprises a multi-faceted diamond-shaped figure formed in the reflective material, said figure having two pairs of opposing facets all meeting at a common vertex, the facets of each said pair extending outwardly from said vertex and having included half-angles of substantially 45° so that light impinging on said element generally parallel to the central axis of said element is reflected by each opposing facet of one of the pairs of opposing facets without impinging either facet of the other pair of opposing facets to retroflect the light parallel to the impinging light.

* * * * *